Figure 1:
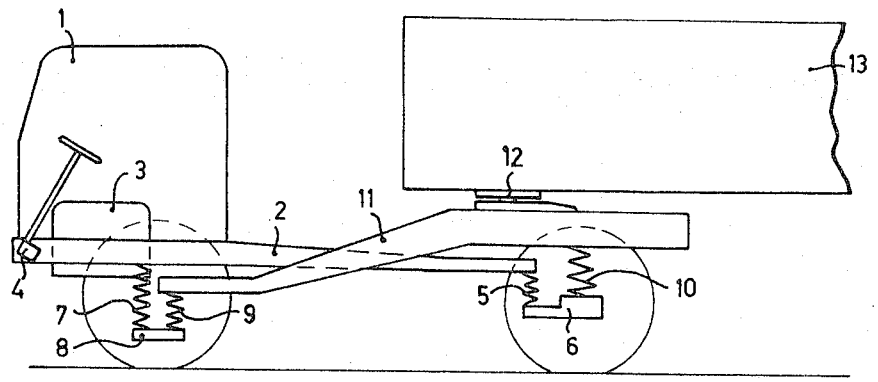

United States Patent [19]
van der Burgt et al.

[11] 3,784,219
[45] Jan. 8, 1974

[54] SUSPENSION SYSTEM FOR ROAD TRANSPORT VEHICLES
[75] Inventors: Gerrit Johan van der Burgt, Pijnacker; Dusan Ryba, Delft, both of Netherlands
[73] Assignee: Van Doorne's Automobielfabrieken N.V., Eindhoven, Netherlands
[22] Filed: Jan. 27, 1972
[21] Appl. No.: 221,178

[30] Foreign Application Priority Data
Jan. 28, 1971 Netherlands...................... 7101116

[52] U.S. Cl. .......................... 280/104, 280/106.5 R
[51] Int. Cl.............................................. B60p 1/24
[58] Field of Search.............. 280/106.5 R, 106.5 A, 280/104, 124 R

[56] References Cited
UNITED STATES PATENTS
1,414,749  5/1922  Penn ............................ 280/106.5 R
1,480,279  1/1924  MacLachlan ................ 280/106.5 R FOREIGN PATENTS OR APPLICATIONS
380,801  9/1923  Germany............................ 280/104

Primary Examiner—Philip Goodman
Assistant Examiner—John A. Carroll
Attorney—E. F. Wenderoth et al.

[57] ABSTRACT

A suspension system for road transport vehicles in which the total axle pressure on at least one axle of the vehicle, or on two independent wheel suspensions positioned in a single transverse plane, is applied through two separate spring assemblies operating thereon. Each of the spring assemblies has a pair of spaced springs having shock absorber means associated therewith. Each spring assembly supports a mass representing part of a vehicle and having a weight amounting to at least one quarter of the total axle mass. The weight masses are free to move relative to one another and to move relative to the axle.

7 Claims, 6 Drawing Figures

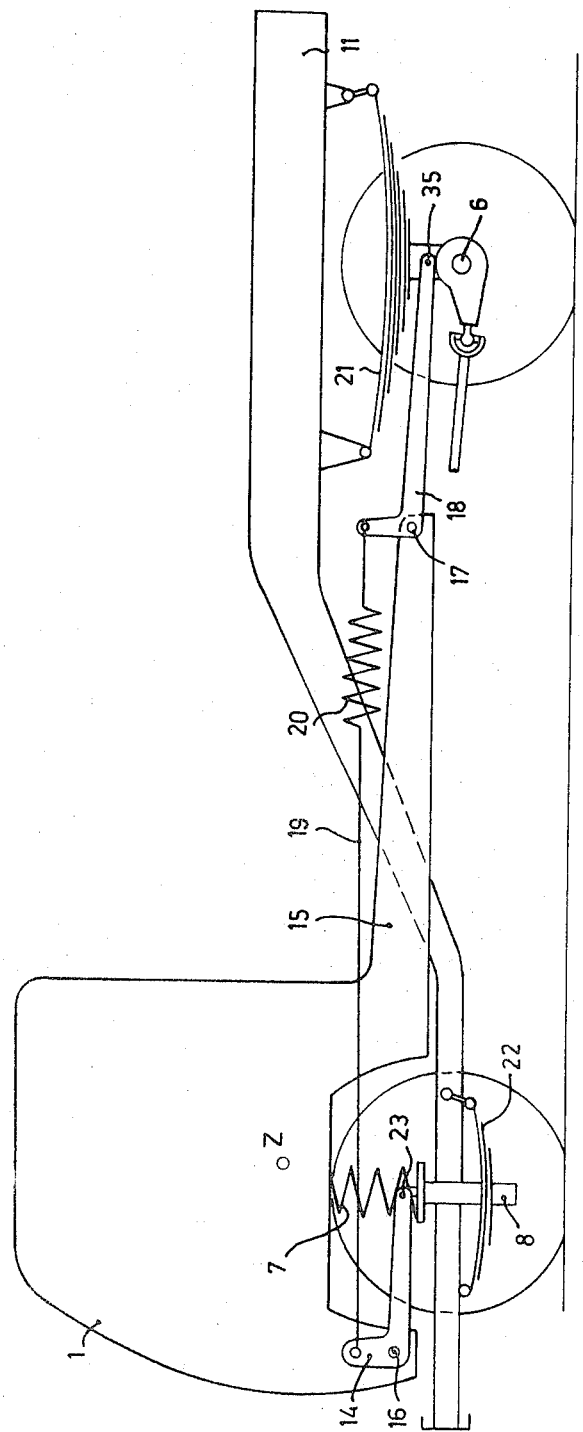
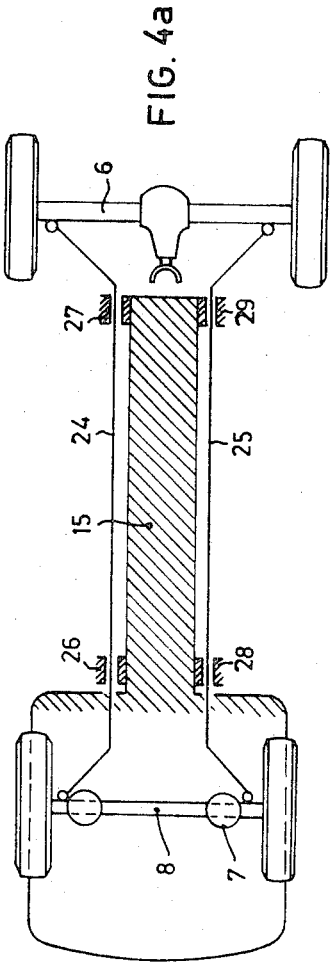
FIG. 4
FIG. 4a

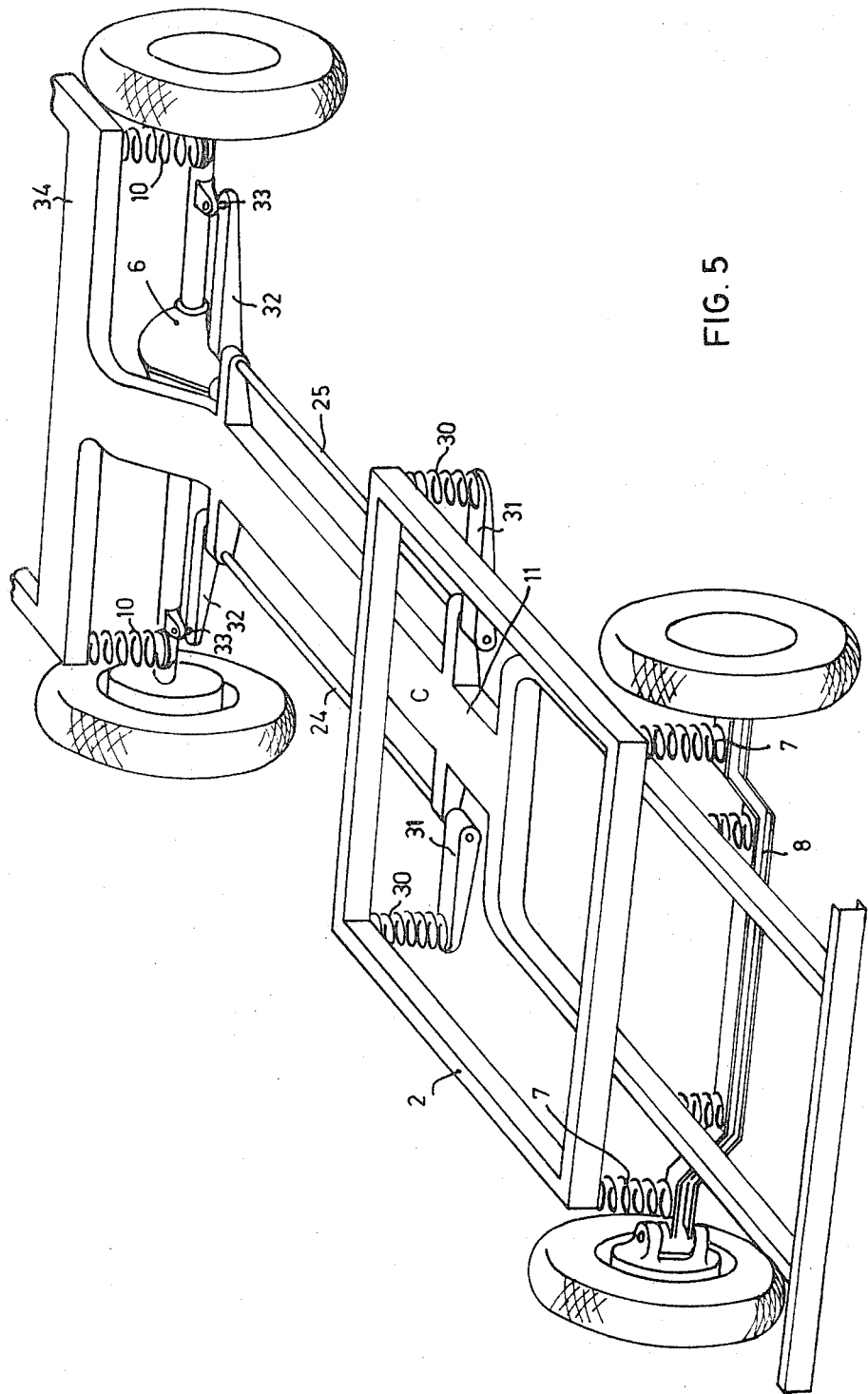

SUSPENSION SYSTEM FOR ROAD TRANSPORT VEHICLES

The present invention relates to road transport vehicles and particularly to improved suspension means therefor. More specifically, the invention sets out to improve the suspension of the steering posiiton or the cabin in which the driver is positioned, for example in trucks and in the tractor of tractor-semi-trailer combinations. However, the invention can also be applied to agricultural or industrial tractors, bulldozers or the like, or to motor coaches.

In the usual construction of trucks and tractors the driver's cabin is attached to the frame of the vehicle by means of flexible rubber elements, the frame being generally supported on the axles by means of leaf springs. The wheels of the vehicle are normally provided with pneumatic tyres having a pressure of at least 5 kg/cm$^2$. Generally the leaf springs cannot be soft, i.e. too resilient, because they have to be designed to suit all conditions where the weight of the vehicle varies between an empty and a fully loaded condition. Additionally, in trucks a relatively great difference in the level of the centre of gravity in relation to the springs can result depending upon the shape and position of the load, so that when soft springs are used, the inclination or the roll of the vehicle when negotiating a bend will impede the speed of the vehicle. Therefore, the load-carrying part of the vehicle and the drivers cabin are badly isolated against vibration caused by rough roads as compared with passenger-carrying cars. This is shown by comparing the natural frequency for passenger cars which is 1–1.5 Hz, with the value for trucks which is 2Hz in a fully loaded condition increasing to 3Hz in an empty condition. Thus, in using the construction described above, the greatest dis-comfort arises in tractor-semi-trailer combinations. In this type of vehicles rotational vibration or pitching occurs about a transverse axis of the drivers cabin, i.e. the front and rear springs act contrary to each other, at a frequency of 3–4 Hz. The reason for this is that such vehicles have a very short wheelbase and the small moment of inertia of the mass produced in relation to the stiff rear springs, on which an important portion of the weight of the semi-truck is supported, does not contribute to the moment of inertia of the mass. The use of relatively stiff springs is dependent upon the restrictions described above and involves a loss of load capacity as compared with the extra load capacity available with larger, softer springs with the possible use of torsion stabilizers to counter the excessive roll.

One known means to avoid the above disadvantage is the use of air springs in which air pressure in bellows type springs is varied according to the load in order to obtain sufficient free-travel for axle movement with the use of more flexible springs, and to obviate differences in the level of the centre of gravity created by the load. Such systems have the disadvantage that they require a compressor, control means, pipelines and storage tanks. In addition, the bars for locating the axles and the torsion stabilizers require additional pivots. Therefore, such systems require much more care and maintenance than the standard leaf springs.

Another known system is based on the idea of absorbing shocks in the usual way by means of relatively soft leaf springs. the cabin being resiliently mounted on the frame by means of relatively flexible rubber blocks or steel springs, sometimes a shock absorber being added. This solution, can contribute little to the comfort of the driver when 3Hz is encountered but it can isolate well against vibrations of higher frequencies, for example more than 7Hz.

It is among the objects of the present invention to remove or substantially reduce the aforementioned disadvantages.

According to the present invention, there is provided a suspension system for road transport vehicles in which the total axle pressure on at least one axle of the vehicle, or on two independent wheel suspensions positioned in a single transverse plane, is applied through two separate spring assemblies operating thereon, each of said spring assemblies comprising a pair of spaced springs having shock absorber means associated therewith, wherein each spring assembly supports a mass representing part of a vehicle and being of a weight amounting to at least one quarter, but preferably more, of the total axle mass, said weight masses being free to move relative to one another and to move relative to the axle.

Thus, the invention is based on the appreciation that the load to be conveyed rarely requires very good suspension, but that isolation against impacts is however necessary for the driver and for the various means which are used by the driver for driving and propelling the vehicle. In order to achieve this object, two constructional units are formed, one being intended to house the driver and all that is necessary for operating the vehicle, and the other being intended to accomodate the load. Each unit is supported by the axles or wheel suspension via its own suspension system. For the sake of simplicity of construction it is also possible to have one unit suspended from the other unit.

Figure 2:
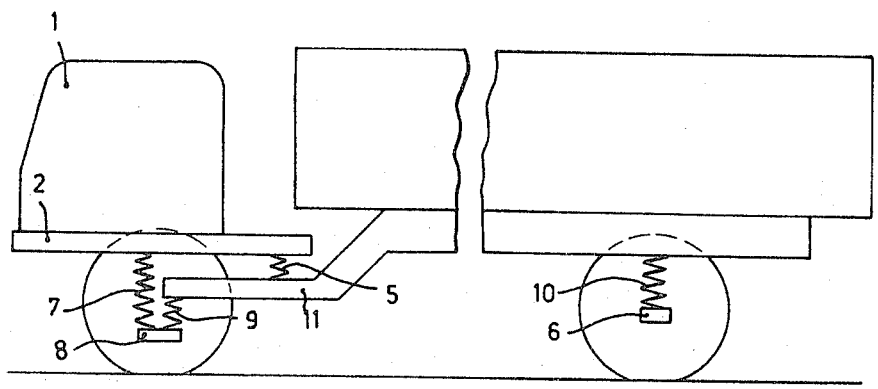
Figure 3:
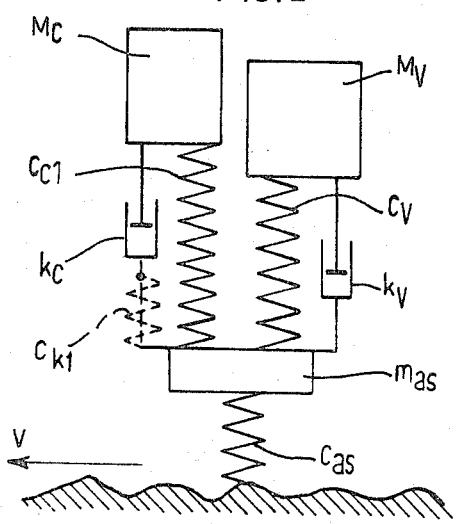

The invention is diagrammatically illustrated by way of example in the accompanying drawings in which, FIG. 1 is a side view of one embodiment in accordance with the invention, FIG. 2 is a side view of another embodiment, FIG. 3 shows schematically a suspension system for the front or rear axles of a motor vehicle which incorporates dynamic shock absorbers, FIG. 4 is a side vew of still another embodiment, FIG. 4a is a plan view of an alternative to the embodiment of FIG. 4, and FIG. 5 is a perspective view of a still further embodiment.

Referring to FIG. 1 there is shown a tractor cabin 1 mounted on a frame 2 on which an engine and gear box indicated at 3, and steering means 4, are positioned, said frame being supported on a rear axle 6 via springs 5 and on a front axle 8 by means of springs 7. A load frame 11 carrying a discshaped platform 12 for a semi-trailer 13, is also provided, the load frame being supported by the front and rear axles respectively via springs 9 and 10.

FIG. 2 shows a similar structure as applied to a truck having a loading-carrying box, in which the cabin 1 with the cabin frame 2 is supported by the front axle 8 by means of springs 7, the rear end of said frame 2 being supported, via springs 5, arranged between the cabin frame 2 and the load frame 11, said load frame 11 being supported by the front axle 8 and the rear axle 6 by means of springs 9 and 10 respectively.

By using the aforementioned structure it will be seen that the springs supporting the load frame 11, the weight of which load frame can vary considerably between a fully empty and a fully loaded condition of the load-carrying part of the vehicle, can be dimensioned to suit any existing requirements hold concerning the isolation of the load against impact (i.e. they can be generally stiffer and therefore have a lower spring weight than is normal in such vehicles), without having any appreciable influence on the spring suspension of the cabin 1, whereas the springs supporting the cabin frame 2, the weight on which varies only slightly due to the weight of the persons sitting in the cabin and possibly due to the weight of the fuel, can be dimensioned to provide, without great difficulty, a suspension which has the same or even less natural frequency as that of passenger-carrying cars thus providing comparable comfort.

A particular advantage of the system according to the invention is that it makes it easy to suppress the amplitude of vibration, and the reciprocation of the relatively heavy axles and their wheels, if the motion induced by a road surface produces components of vibration having a frequency of 7–12Hz (which frequency in the region of the natural frequency of the axle spring on its tyres), in a way which is favourable to effect isolation against vibration of the cabin.

FIG. 3 illustrates schematically a spring suspension for the front or rear axles of a vehicle wherein two masses act individually on the axle each via their own spring systems. Thus, the load frame means $M_r$ acts on the axle mass $m_{as}$ supported on the tyres of the vehicle which have a spring stiffness $c_{as}$, through the main support spring having a spring stiffness $c_v$ and a shock absorber having an absorbtion content $k_v$. The cabin mass $M_c$ similarly acts on the axle mass $m_{as}$ via the main spring having a spring stiffness $c_{cl}$ and a shock absorber having a constant $k_c$ in series with an optional relaxation spring $c_{kl}$.

The system of FIG. 3 is identical to that of an axle the suspension of which incorporates a dynamic shock absorber. The application of this system to motor cars has never become of importance, notwithstanding its proven theoretical and practical advantages, because the effectiveness of the shock absorber depends on the absorbing mass ratio and therefore it requires at least 30 percent of additional axle weight in order to obtain a distinctly marked effect. In the structure according to the present invention, however, the question of additional weight does not arise because, in an empty truck, the load frame is sufficient to provide the required absorbing mass. The springs and the shock absorbers of the load frame can be dimensioned so that the movement of the axle is small. Now, it is possible to provide optimal comfort in the suspension of the cabin, for which purpose the shock absorber can be mounted in series with a relaxation spring, so that vibration components of considerably higher frequencies than the natural frequency of the cabin suspension, i.e. the reciprocatory movement of the axles, can be much better isolated than is possible in the usual known constructions.

The ratio of distribution of mass to be considerd will depend on what one considers useful units. It is possible for example to mount the engine and the gear box in the load frame 11 or in the cabin frame 2. The same applies to the steering mechanism and the brakes of the vehicle. In all cases, however, the control means, steering means, pedals and the other control handles must be interconnected with the parts to be moved by means of flexible actuating elements.

The embodiments of the invention hereinbefore described with reference to FIGS. 1 and 2 start from the principle that vertical or translation suspension is the most important. In vehicles having a short wheel base, however, this is not always a determining factor because rotational vibration (also called pitch) can be extremely troublesome. In order to counteract this feature, the pitch frequency must also have a low value. In a number of cases the position of the centre of gravity of the cabin frame 2 will be very closely above the front axle. In this case, the form of suspension described with reference to FIG. 4 is one in which the pitch frequency is determined exclusively by the choice of a single spring stiffness. Referring to FIG. 4, the self-supporting cabin 1 is supported by the helical springs 7, which in turn are supported by the front axle 8. A bellcrank lever 14 is arranged to pivot about a fixed pivot point 16 provided on the cabin 1, one arm of the bellcrank lever being pivotally connected at 23 to the front axle 8. The cabin is provided at its rear end with an extension in the form of a beam 15, said beam having at its free end a pivot 17 about which a bellcrank lever 18 can turn, said bellcrank lever 18 being connected to the centre of the rear axle 6 by means of a pivot connection 35. There is a link between the bellcrank levers 14 and 18 consisting of a draw bar 19 and a helical spring 20. In this case the load frame 11 is supported on the rear axle 6 by means of leaf springs 21, and on the front axle 8 by means of leaf springs 22. When the cabin 1 is moved vertically and on an even keel, the length of the spring 20 is varied as also is its resilience. However, the arrangement of bellcrank levers 14 and 18 is such that the lengths of the springs 7 are varied accordingly with the result that any tendency for the cabin to pitch is neutralised. If the cabin is turned about the pivot 23, however, the resilience of the spring 20 will exert a force to counteract this movement.

As shown in FIG. 4a a similar effect can also be obtained by means of one or two torsion bars 24, 25 extending lengthwise of the cabin beam 15 and hingedly secured thereto in pivot bearings 26, 27, 28, 29. The torsion bars 24, 25 are cranked at their ends and are connected to the front and rear axles respectively at said ends as shown in the drawing. It is not necessary that the torsion bar or bars, any more than the springs 5, 7, 9, 10 be connected to the axles by their ends. Whilst FIG. 2 shows the springs 5 mounted between the cabin frame 2 and the load frame 11, it may be advantageous in the embodiment of FIG. 4a, to attach one or both ends of the torsion bars, possibly via coupled levers, to the load frame instead of to the axle.

FIG. 5 illustrates an embodiment of the invention in which the mass provided by the cabin operates on the axle by means of its own suspension system, although the suspension of the cabin is not completely independent of the load frame.

The cabin frame 2 is supported by the front axle 8 by means of springs 7. At its rear end the cabin frame is supported on levers 31 via springs 30. The levers 31 are fixed to one end of the torsion bars 24, 25 which are pivotally mounted in the load frame 11, the other ends of the torsion bars 24, 25 having fixed thereto levers 32 which are pivotally connected, via pivots 33, to the rear axle 6. The load frame 11 is supported on the rear axle 6 by means of a transverse beam 34 and the springs 10.

In the arrangement of FIG. 5, it will be seen that movement of the load frame will not result in displacement of the springs 30 and therefore the effect will be that the cabin frame 2 is supported by the axles. If the load frame is turned about the transverse axis of the vehicle, e.g. upwards at the rear end and about the centre C in a downward direction the springs 30 will be displaced downwardly. In this respect, the angle amplitude imparted to the cabin frame is the same as if the vehicle had a wheelbase the equivalent of the distance from the front axle to the levers 31 on the torsion bars 24, 25.

In an alternative arrangment the springs 30 could be dispensed with provided the bars 24, 25 are made sufficiently flexible.

It is also possible to displace the supporting points of the cabin frame at the front axle and at the rear axle and to position said supporting points closely to the centre of gravity C. In order to obtain a suitable pitch frequency it is also possible to make use of a coupled spring and draw bar suspension system as is described with reference to FIG. 4.

In the systems of the invention as hereinbefore described, reference has been made to the division of a vehicle into a cabin portion which is supported to provide comfort for the driver and cabin passengers, and a portion for carrying a load, the spring suspension being arranged in such a way that the wheel movements are absorbed as much as possible. It is however comtemplated that the system may be applied to passenger vehicles, and particularly motor coaches, in which use can be made of the mass of the engine and the spare wheel for absorbing the movement of the wheels by arranging said masses according to the method described with reference to FIG. 5 wherein the wheels are supported by means of springs and shock absorbing members so that said masses act as part of a dynamic shock absorber for the wheel movements. The vehicle body, indicated above as the load frame, can then be suspended by springs in an optimal way with a view to the transportation of passengers, in which more particularly the application of relaxation absorbation is rendered possible by the invention. The functions of both mass portions operating on one axle can be interchanged in proportion as one or the other is more suitable to act as a shock absorbing mass for the axle. In practice, the stiffness and torsional strength, and the distribution of masses, of the load frame 11 determine the frame movement of the embodiment according to FIG. 4 if the shock absorbing mass lies at a relatively great distance from the axles.

What is claimed is:

1. A suspension system for a road transport vehicle, said vehicle having a plurality of axles, said vehicle further including a plurality of independent masses, said suspension system comprising:
   first and second separate spring assemblies acting directly on a first of said axles;
   the entire pressure acting on said first axle being applied through said first and second spring assemblies;
   each of said first and second spring assemblies supporting a separate one of said independent vehicle masses;
   each of said supported masses having a weight amounting to at least one quarter of the total axle mass; and
   said supported vehicle masses being free to move relative to one another and free to move relative to said first axle.

2. A system as claimed in claim 1, further comprising third and fourth spring assemblies acting on a second of said axles, each of said third and fourth spring assemblies supporting a separate one of said independent vehicle masses, each of said vehicle masses being operatively coupled to one of said spring assemblies of each of said axles.

3. A system as claimed in claim 2, wherein the springs of each of said spring assemblies are freely movable relative to one another and relative to the springs of each other.

4. A system as claimed in claim 1, wherein one of said vehicle masses supported by one of said first and second spring assemblies is further supported on a second of said axles by a single third spring assembly.

5. A system as claimed in claim 4, further comprising a fourth spring assembly on said one vehicle mass supporting a second of said vehicle masses.

6. A system as claimed in claim 4, further comprising torsion bars having cranked ends pivotally mounted on said one vehicle mass and operable to transmit movement of said third spring assembly to one of said axles.

7. A system as claimed in claim 4, further comprising a bellcrank lever assembly connected between said first and second axles and operatively attached to a second of said vehicle masses to prevent rotation thereof about said first axle.

* * * * *

UNITED STATES PATENT AND TRADEMARK OFFICE
CERTIFICATE OF CORRECTION

PATENT NO. : 3,784,219
DATED : January 8, 1974
INVENTOR(S) : Gerrit Johan van der Burgt and Dusan Ryba It is certified that error appears in the above–identified patent and that said Letters Patent are hereby corrected as shown below:

On the first page of the patent, change the name of the Assignee from "Van Doorne's Automobielfabrieken N.V., Eindhoven, Netherlands" to -- Van Doorne's Bedrijfswagenfabriek Daf B.V., Netherlands --.

Signed and Sealed this

Twelfth Day of December 1978

[SEAL]

Attest:

RUTH C. MASON
Attesting Officer

DONALD W. BANNER
Commissioner of Patents and Trademarks